United States Patent [19]

Phelan et al.

[11] Patent Number: 5,231,745
[45] Date of Patent: Aug. 3, 1993

[54] METHOD OF MAKING A COVER AND FOAM BODY SEAT COMPONENT

[75] Inventors: Raymond J. Phelan, Lake Orion; Kirk J. Daman, Charleviox, both of Mich.

[73] Assignee: Atoma International Inc., Newmarket, Canada

[21] Appl. No.: 728,690

[22] Filed: Jul. 12, 1991

[51] Int. Cl.$^5$ .............................................. B68G 7/00
[52] U.S. Cl. ................................. 29/91.1; 264/45.1
[58] Field of Search .................. 29/91.1, 91, 413, 414,
29/445, 235; 156/250, 251, 258, 267; 264/45.1,
46.4, 46.6, 46.8; 297/452, 455, 458, 460

[56] References Cited

U.S. PATENT DOCUMENTS

| | | |
|---|---|---|
| 4,765,045 | 8/1988 | Selbert et al. |
| 4,831,697 | 5/1989 | Urai ........................... 29/91.1 |
| 4,833,741 | 5/1989 | Mizuno et al. .............. 264/46.4 X |
| 4,968,235 | 11/1990 | Nakane et al. .............. 264/46.4 X |
| 4,987,666 | 1/1991 | Smith . |
| 5,107,576 | 4/1992 | Rohn ........................... 29/91.1 |

FOREIGN PATENT DOCUMENTS

| | | |
|---|---|---|
| 0347503 | 12/1989 | European Pat. Off. . |
| 3613879 | 1/1987 | Fed. Rep. of Germany . |
| 3704528 | 2/1988 | Fed. Rep. of Germany . |
| 2262588 | 9/1975 | France . |

Primary Examiner—Timothy V. Eley
Attorney, Agent, or Firm—Cushman, Darby & Cushman

[57] ABSTRACT

A method of making a seat component including the steps of sewing marginal edges of a plurality of cover material pieces with a plastic strip disposed between exterior surfaces of the marginal edges in a configuration coincident with a elongated sharply concave styling character line to form a seam in which a line of stitches extends through the marginal edges of the cover material pieces and a reduced thickness central portion of the strip along a severance line thereon or slightly outwardly thereof, applying a tape of imperforate material along the interior surface of the seam, positioning a sewn and taped panel of the cover pieces so that the exterior surface thereof is in facing relation to mold face of mold member, inserting an exterior edge portion of the strip into an elongated slot in the mold surface so as to accurately locate the seam of the panel along the elongated sharply convex styling character line, foaming a foamable material so as to adhere a body of foamed material to the interior surface of the panel while the exterior surface is held by vacuum in conformity with the mold surface, removing the panel and then removing the exterior edge portion of strip along the severance line thereof from the panel, a seat formed with one or more such components.

3 Claims, 3 Drawing Sheets

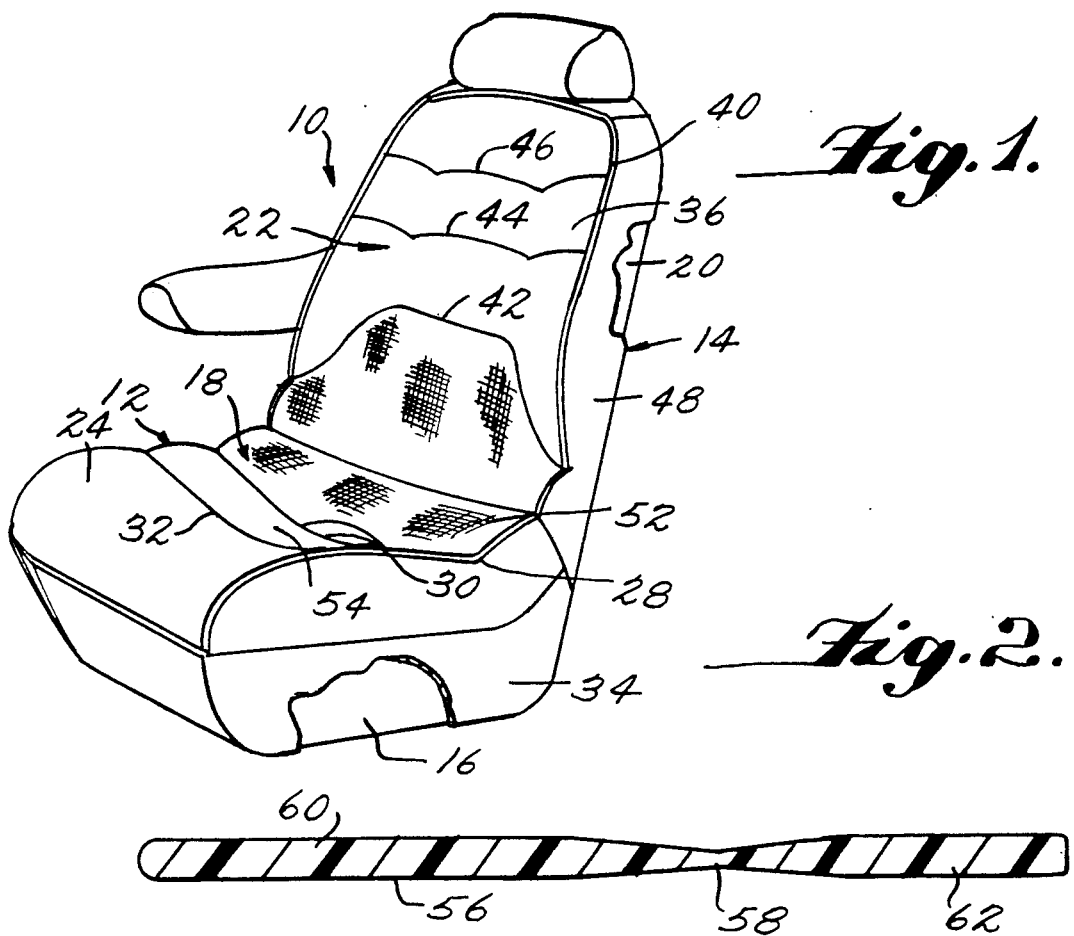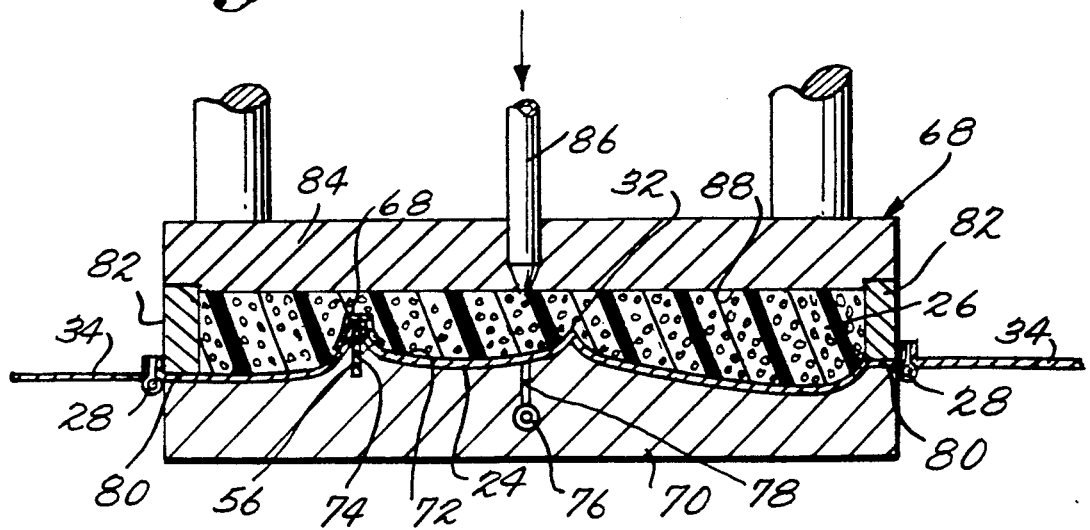

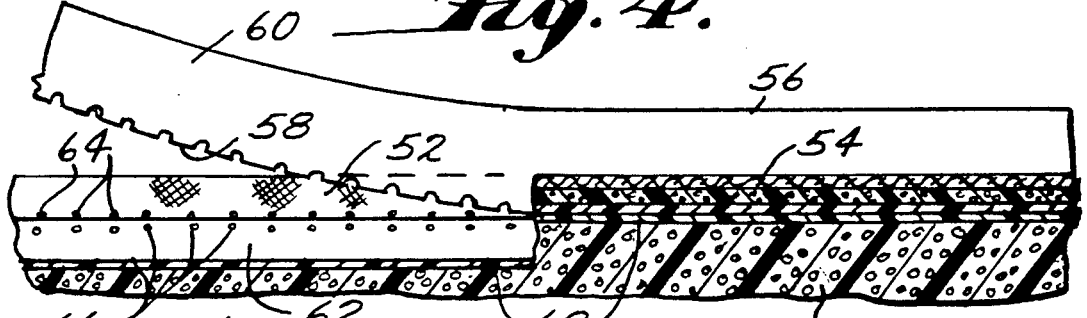
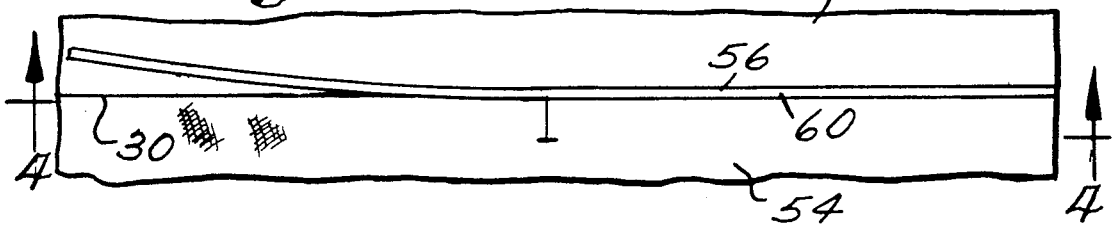
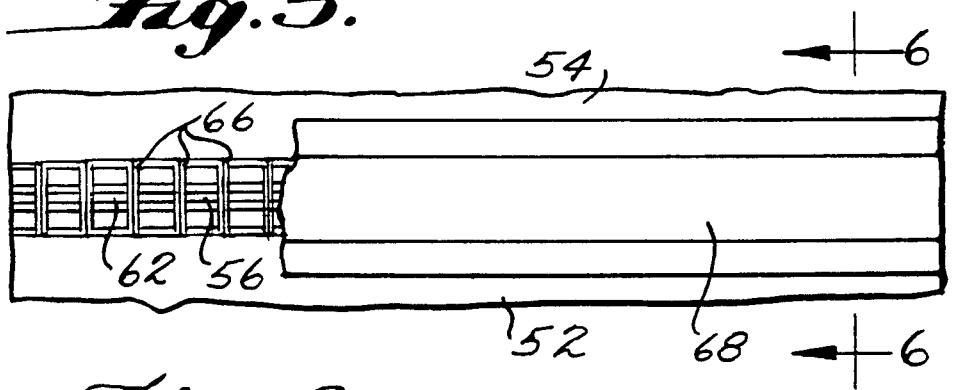
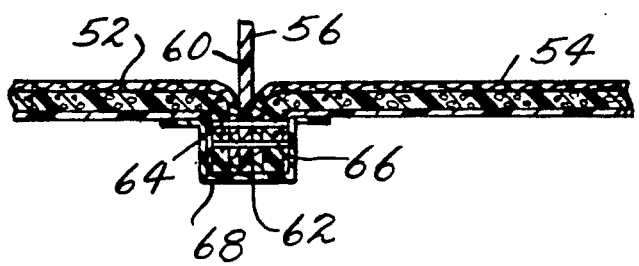

METHOD OF MAKING A COVER AND FOAM BODY SEAT COMPONENT

This invention relates to the art of making seats and more particularly to the art of making cushioned automobile seats.

The present invention relates to improvements in the art of making cushioned automotive seats in accordance with the method as disclosed in published European Patent application No. 0 347 503, dated Dec. 27, 1989, the disclosure of which is hereby incorporated into the present specification. In that patent publication, there is disclosed a method of making a component of a cushioned automotive seat which component consists of a cover member having a body of foamed material on an interior surface thereof. The component may be either for the seat cushion or the seat back. In the case of the seat cushion, the cover member is in the form of a seat cushion panel having a skirt extending from the periphery thereof and the body of foamed material is foamed in place on the interior surface of the seat cushion panel. In the case of the seat back, the cover member is in the form of a bag or sack providing a front panel and a back panel interconnected along opposite sides and closed at one end while open at the other. The body of foamed material is foamed in place on the interior surface of the front panel.

In forming the seat components in accordance with the method of the publication, the seat panel in the case of the seat cushion component or the front panel in the case of the seat back panel has its periphery defined by a seam which serves as a stop when the exterior surface of the associated panel is drawn by vacuum into conformity with a mold surface preparatory to the foam-in-place procedure for the foamed material. In addition to the peripheral seam, another characteristic of the panel which receives the foamed material is that the cover material should be imperforate so that it can be drawn into conformity to the mold surface by a vacuum without the danger of the vacuum drawing unwanted portions of the pour-in-place foam material through the cover material which could result in undesired hard spots in the completed component.

The present method relates to improvements in the method of the publication in situations where, because of styling characteristics desired, the panel of the cover material on which the foam material is foamed in place is formed of two different materials. In general, it can be stated that differences in material, color and/or texture within a seat panel created by utilizing different materials will be united along what are referred to as styling character lines.

Typically, these styling character lines are concave grooves or elongated depressions in the seat panel which means that the mold surface is formed with a comparable convex ridge or an elongated projection. Consequently, a problem which has existed is that it is difficult to ensure that the joint between the two materials defining the foam-receiving panel will line up exactly along the mold ridge so that, in the finished component, the change in color or texture will occur exactly along the specified styling character line.

The present invention relates to improvements in the method of making seat components which overcomes the problem noted above. In accordance with the principles of the present invention, the improved method of the present invention is operable to make a seat cover and foam body component including an occupant-engaging panel of cover material having a predetermined exterior surface configuration and an imperforate interior surface with foamable material foamed in place thereon so as to resiliently yieldingly retain the exterior surface in the predetermined configuration, the predetermined configuration being within a periphery of the panel and having at least one elongated sharply concave styling character line therein. The improved method comprises the steps of utilizing (1) a plastic strip of thin elongated cross sectional configuration having a central portion of reduced thickness dividing the strip along a severance line into opposite exterior and interior edge portions and (2) a plurality of pieces of cover material of different exterior surface appearance to form the cover material panel, sewing marginal edges of the plurality of cover material pieces with the strip disposed between exterior surfaces of the marginal edges in a configuration coincident with the elongated sharply concave styling character line to form a seam in which a line of stitches extends through the marginal edges of the cover material pieces and the reduced thickness central portion of the strip along the severance line or slightly outwardly thereof, applying a tape of imperforate material along the seam in sealed relation with the imperforate interior surfaces of the cover material pieces, positioning the sewn and taped panel so that the exterior surface thereof is in facing relation to a molding member having a mold surface formed with a mirror image of the predetermined configuration including an elongated sharply convex ridge corresponding with the sharply concave character line having an elongated slot therein, inserting the exterior edge portion of the strip into the elongated slot so as to accurately locate the seam of the panel along the elongated sharply convex styling character line, creating negative pressure conditions between the mold surface of the molding member and the exterior surface of the panel through openings in the mold surface so as to conform the exterior surface of the panel to the mold surface of the molding member, establishing a confined space on the interior surface of panel within which a charge of foamable material is contained, foaming the foamable material within the confined space so as to adhere a body of foamed material to the interior surface of the panel while the exterior surface is in conformity with the mold surface, removing the panel with the body of foamed material adhered to the interior surface thereof from the mold surface including the exterior edge portion of the strip from the elongated slot, and removing the exterior edge portion of the strip along the severance line thereof from the panel.

The invention is also directed to an automotive vehicle seat combination embodying one or more seat cover and foam body components made in accordance with the method of the present invention. In accordance with the principles of the present invention, the automotive vehicle seat comprises a seat cushion assembly and a seat back assembly. One of the assemblies includes a frame and a cover and foam body component mounted in covering relation with respect to the frame. The cover and foam body component includes an occupant-engaging panel of cover material having a predetermined exterior surface configuration and an imperforate interior surface. The predetermined configuration is within a periphery of the panel and has at least one elongated sharply concave styling character line therein. The panel is formed of two pieces of cover material of different exterior surface appearance having marginal edges conforming with the styling character line. The marginal edges are sewn together by a line of stitches to form a seam which exteriorly follows the sharply concave styling line defined by the different exterior surface appearances of the cover material pieces. The marginal edges extend from the line of stitches interiorly and having a plastic strip of thin elongated cross-sectional configuration between the exterior surfaces thereof. The plastic strip has a severed edge of reduced thickness adjacent the line of stitches. A tape of imperforate material extends over the marginal edges and plastic strip and is adhered to the imperforate interior surfaces of the cover material pieces, and a body of foam material is foamed in place on the interior surfaces of the cover material pieces and said tape so as to resiliently yieldingly retain the exterior surface of the panel in the predetermined configuration.

The invention may best be understood with reference to the accompanying drawings wherein an illustrative embodiment is shown.

IN THE DRAWINGS

FIG. 1 is a perspective view of an automotive vehicle seat embodying the principles of the present invention with certain parts broken away for purposes of clear illustration;

FIG. 2 is a cross-sectional view of the guide strip of the present invention;

FIG. 3 is a fragmentary exterior plane view of the seam along a portion of the styling line of one of the occupant-engaging panels of the seat shown in FIG. 1 with a portion of the strip being removed;

FIG. 4 is a sectional view taken along the line 4—4 of FIG. 3;

FIG. 5 is an interior plan view of the portion of the seam shown in FIG. 3 with the foam body removed and parts broken away for purposes of clear illustration;

FIG. 6 is a fragmentary sectional view taken along the line 6—6 of FIG. 5;

FIG. 7 is a longitudinal sectional view of a mold assembly showing the manner in which the cover and foam body component of the seat cushion assembly of the seat shown in FIG. 1 is made therein.

Figure 8:
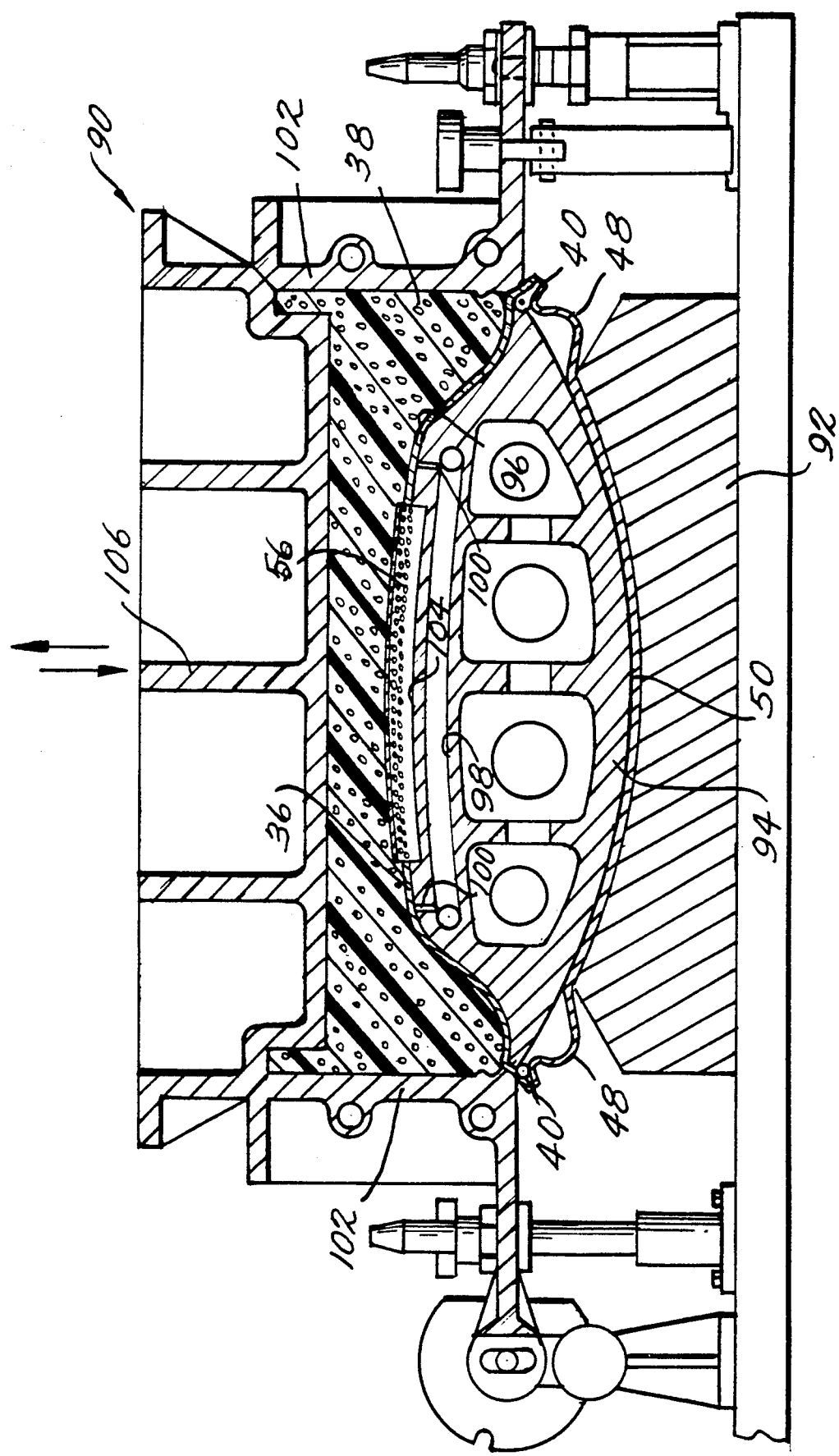
FIG. 8 is a transverse sectional view of another mold assembly showing the manner in which the cover and foam body component of the seat back assembly of the seat shown in FIG. 1 is made therein.

Referring now more particularly to the drawings, there is shown in FIG. 1 thereof an automotive vehicle seat, generally indicated at 10, embodying the principles of the present invention having components thereof which are made in accordance with the method of the present invention. The seat 10, as shown, is for a single occupant but it will be understood that the method can be used to make components of an automotive vehicle seat which accommodate two or three occupants. The seat 10, as shown in FIG. 1, consists essentially of a seat cushion assembly, generally indicated at 12, and a seat back assembly, generally indicated at 14. The seat cushion assembly 12 includes a conventional frame structure 16 which extends within the periphery of the seat cushion assembly and has suitable springs (not shown) extending across an open top thereof. Mounted over the frame structure 16 is a seat cushion cover and foam body component, generally indicated at 18, which is made by the method of the present invention.

The seat back assembly 14 likewise includes a frame structure 20 which is fixed to the frame structure 16 of the seat cushion assembly 12 but may be articulated thereto in various ways utilizing various latching mechanisms all in accordance with the known constructions. The seat back assembly 14 also includes a seat back cover and foam body component, generally indicated at 22, which likewise is made in accordance with the method of the present invention. It will be understood that, while it is preferable to make both cover and foam body components 18 and 22 in accordance with the present invention, the present invention contemplates a seat in which only one of the assemblies includes a cover and foam body component made in accordance with the present method and the other made conventionally.

The cover and foam body component 18 includes an occupant-engaging panel 24 of cover material having a predetermined exterior surface configuration and an imperforate interior surface with foamable material foamed in place thereon so as to provide a foam body 26 resiliently yieldingly retaining the exterior surface of the panel 24 in the predetermined configuration. The predetermined configuration of the seat cushion component is included within a generally rectangular periphery 28 of the panel 24 and has a plurality of elongated sharply concave styling character lines 30 and 32 therein. A skirt 34 of cover material is seamed to the occupant-engaging panel 24 along the periphery 26 thereof. When the component 18 is mounted over the frame structure 16, the foam body 26 rests on the frame springs and the skirt 34 extends over the frame structure 16 and is suitably secured beneath the lower edge of the frame structure 16 of the seat cushion assembly 12.

The cover and frame body component includes an occupant-engaging panel 36 of cover material having a predetermined exterior surface configuration and an imperforate interior surface with foamable material foamed in place thereon so as to provide a foam body 38 (see FIG. 8) resiliently yieldingly retaining the exterior surface of the panel 36 in the predetermined configuration. The predetermined configuration is included within a periphery 40 of the panel 36 and has a plurality of elongated sharply concave styling character lines 42, 44, and 46 within the periphery 40. The seat back 22, component also includes a U-shaped edge piece 48 of cover material which is seamed to the periphery 40 of the panel 36 and a back panel piece 50 (see FIG. 8) integral with the U-shaped edge piece 48 so as to form a bag or sack which is telescoped over the frame structure 20 of the seat back assembly 14.

In accordance with the principles of the present invention, the present method is particularly useful in constructing the seat cushion component 18 and/or the seat back component 22 of the seat 10 where the associated occupant-engaging panel, for aesthetic purposes, is to be formed of different cover materials so as to provide a different appearance, either by color or texture or both, within the periphery of the panel along a sharply concave styling character line. In the illustrative embodiment shown, the seat cushion panel 24 is formed of two pieces of cover material 52 and 54 which provide a contrasting appearance along the elongated sharply concave styling character line 30. The seat back panel 36 is formed of two pieces of cover material which provide a contrasting appearance along the styling character line 42.

FIGS. 3-6 illustrate how the two pieces of cover material 52 and 54 are seamed together in accordance with the principles of the present invention and it will be understood that the two pieces of cover material of the panel 36 are similarly seamed together so that a description of the seam of the seat cushion panel 24 will suffice as a description of the seam of the seat back panel 36.

As best shown in FIG. 2, the seam utilizes an extruded plastic strip 56 of thin elongated cross-sectional configuration having a central portion of reduced thickness dividing the strip along a severance line 58 into opposite exterior and interior edge portions 60 and 62. The pieces of cover material 52 and 54 in the exemplary embodiment shown are each formed by an exterior surface ply of fabric, such as velour or the like, an inner ply of foam plastic, preferably open cell foam, and an interior surface ply of a thin film of air impermeable or imperforate plastic material, as, for example, polyester (e.g., Platilon manufactured by Atochem Inc.). It will be understood that other cover materials may be utilized as, for example, vinyl or leather.

In practicing the principles of the present method, the marginal edges of the two pieces of cover material 52 and 54 are first cut to the shape of the styling line 30 and then assembled with the interior edge portion 62 of the strip 56 disposed between exterior surfaces of the marginal edges in a configuration coincident with the elongated sharply concave styling character line 30. The marginal edges of the pieces 52 and 54 and the strip 56 are sewn to form a seam which coincides with the styling character line 30 in which a line of conventional lock stitches 64 extend through the marginal edges of the cover material pieces 52 and 54 and the reduced thickness portion of the strip 56 along the severance line 58 or slightly outwardly thereof toward the exterior edge portion 60.

Optionally, in order to gather together the marginal edges of the cover pieces 52 and 54 and the interior edge portion 62 of the strip 56 extending inwardly of the line of stitches 64, the seam inwardly of the stitches 64 is stitched on a serge sewing machine. The serging 66 thus provided serves to place the seam on the interior side of the cover material in a condition to facilitate the sealing of the seam so as to render the entire panel 24 impermeable to air.

After the interior of the seam has been sewn, a tape 68 of imperforate thin material, as, for example, polyester film with adhesive on one side, is applied over the interior of the seam and adhered to the film forming the interior surface ply of the pieces of cover material 52 and 54 so as to render the interior of the panel 24 impermeable to the passage of air. It will be noted, however, that the exterior edge portion 60 of the strip 56 extends from the exterior surfaces of the cover material pieces 52 and 54.

After the seat cushion cover and foam body component 18 has been sewn and taped in the manner described above, the sewn and taped seat cushion component 18 is then mounted in cooperating relation with a mold assembly, generally indicated at 68, preparatory to the step of foaming in place the foam material on the interior surface of the occupant-engaging panel 24. As best shown in FIG. 7, the mold assembly 68 includes a base 70 which provides a mold surface 72 shaped as a mirror image of the predetermined configuration of the occupant-engaging panel 24 of the seat cushion component 18. It is important to note that, since the mold surface 72 is a mirror image of the predetermined configuration of the panel 24, the portions of the mold surface 72 corresponding with the sharply concave styling character lines 30 and 32 are sharply concave. Moreover, the sharply concave portion of the mold surface 72 corresponding to the styling line 30 has an elongated slot 74 extending therein.

The base 70 is formed with an interior passage or manifold system 76 of which communicates with the exterior of the mold surface 72 through a series of communicating openings 78 extending therethrough. It will also be noted that the base 70 provides a peripheral surface 80 surrounding the mold surface 72 which is adapted to cooperate with a peripheral mold member 82 mounted for movement toward and away from the base 70. This movement of the mold member 82 is preferably a pivotal movement although a rectilinear movement may be utilized as well.

In addition to the separate movable mold member 82, the mold assembly 68 also includes a mold lid 84 which, like the mold member 82, is mounted for movement toward and away from the base 70. Here again, a preferred movement is a pivotal movement although a rectangular movement may be utilized if desired. In FIG. 7, the mold assembly 68 is schematically illustrated as including a foam material injector 86 which is extended through the mold lid 84 so as to communicate with a space 88 above the upwardly facing interior surface of the panel 24 defined by the lower interior surface of the mold lid 84 and the interior periphery of the mold member 82 when in operative position. It will be understood that, instead of providing an injector which extends through the lid 84, the injector may be utilized when the lid is in an open position to inject a suitable charge of foamable material onto the interior surface of the panel 24 within the interior periphery of the mold member 82.

Prior to the insertion of the charge of moldable material, the panel 24 must be placed in cooperating relation with the mold assembly 68. To accomplish this step, the lid 84 and mold member 82 of the mold assembly 68 and 70 are both pivoted away from the base 70 so as to expose the mold surface 72 and the peripheral surface 80 of the base 70 preparatory to mounting the panel 24 in the operative position thereon. In placing the panel 24 on the mold surface 72, the operator must take care to initially insert the exterior edge portion 60 of the strip 56 within the slot 74. It will also be noted that the initial deployment of the panel 24 over the base 70 is such that the seam 28 at the periphery 80 of the panel 24 is disposed exteriorly of the peripheral surface. Once the panel has been initially positioned over the mold surface 72 of the base 70 as indicated, the molding member 82 is then moved downwardly to contact the interior surface of the panel 24 at a position adjacent and inwardly of the peripheral seam 28. It can be seen that the position of the seam 28 outwardly of the position of cooperation of the peripheral mold member 82 with the peripheral surface 80 is such that the seam 28 serves as a stop to limit the movement of the panel 24 material inwardly when the next step of conforming the panel 24 to the mold surface 72 is undertaken. This step can be facilitated by movable plungers (not shown) which sequentially engage the interior surface of the panel 24 to ensure that portions thereof are distributed throughout the concave portions of the mold surface 72 between the sharply convex portions thereof. Thereafter, a source of vacuum (not shown) is communicated with the manifold system 76 as to create through openings 28 a negative pressure condition between the mold surface 72 and the panel 24 which draws the exterior surface of the panel in conformity with the mold surface 72. Thereafter, either the charge of foamable material is inserted before lid 84 is closed or thereafter. As previously indicated, the lid 84 and peripheral mold member 82 define a space 88 which is filled as the charge of foamable material is foamed and cured into a foam body 26, so as to resiliently retain the panel 24 in its predetermined configuration.

The panel 24 with the foam body 26 foamed in place thereon and, hence, fused to the interior surface thereof is removed from the mold assembly 68 after raising the lid 84 and peripheral mold member 82. After the thus-formed seat cushion component 18 is removed from the mold assembly 68, the exterior edge portion 60 of the strip 56 which extends from the exterior surface of the panel 24 is removed from the panel. This is accomplished by manually gripping one end and pulling which progressively severs the exterior edge portion 60 along the severance line 58. This progressive severance is illustrated in FIGS. 3 and 4. This leaves the exterior of the seam provided by the stitching 64 in a configuration corresponding with the styling character line 30 and presents a seam which is comfortable when engaged by the occupant. It will be understood that, after the seat cushion component 18 has been completed in the manner described above, it is then mounted over the frame 16 and secured in its operative position as aforesaid.

As previously indicated the seat back panel 36 is sewn together with the edge piece 48 in an inverted or inside-out relationship so that the panel 36 and pieces 48 and 50 form a sack or bag-like structure which cannot be simply moved downwardly onto a mold surface such as the mold surface 72. Consequently, a cantilever-type mold assembly, generally indicated at 90, is preferably used to mold the foam body 38 in place on the interior of the panel 36.

As best shown in FIG. 7, the mold assembly 90 includes a base 92 on which a tongue-like mold 94 is pivotally mounted for movement between a raised bag-engaging and removing position, and lowered operative position, as shown in FIG. 7. The tongue-like mold 94 has a mold surface 96 having a configuration which is a mirror image of the predetermined exterior configuration of the panel 36. The tongue-like mold 94 also includes a vacuum manifold system 98 which extends to the exterior of the mold surface 96 through a series of openings 100. The mold assembly 90 also includes a peripheral member 102 which is pivoted to the base 92 so as to be moved between an inoperative position, which permits the bag-like cover member 36, 48, and 50 to be inserted on the tongue-like mold, and an operative position, such as shown in FIG. 7, as part of the insertion procedure. The exterior edge portion 60 of the strip 56 in the panel 36 is inserted in a slot 104 formed in a convex portion of the molding surface 96. A peripheral edge of the peripheral member cooperates with a peripheral edge of the tongue-like mold 94 to control the movement of the periphery 40 of the panel 36 therebetween in a manner similar to that previously described with respect to periphery 28.

As previously indicated, to facilitate the engagement of the interior surface of the panel 36 with the molding surface 96, a pad assembly (not shown) can be used. Thereafter, a source of vacuum is communicated to fully conform the entire exterior surface of the panel 31 with the mold surface 96.

The next step in the process is to feed into the open peripheral foaming mold member 102 and onto the interior surface of the panel 36 an amount of heat foamable and curable material which will fill the peripheral mold member 102 when closed by a closing lid 106 forming a final part of the mold assembly 90. As shown, the closing lid 90 is pivoted to the base 92 between an open position, permitting the foamable material to be added, and a closed position, such as shown in FIG. 7, wherein the cooperating peripheral mold member 102 is further compressed into engagement with the interior surface 20 of the front panel 35.

The next step in the process is to cure the foamable material so that it foams and fills the space defined by the upwardly facing interior surface of the panel 36, the interior peripheral surface of the peripheral mold member 102, and the downwardly facing surface of the closure lid 106. The foam body 38 thus formed serves to resiliently retain the panel 36 in its predetermined configuration.

The next step in the process is to move the closure lid 106 from its operative position into its inoperative position and then the peripheral mold member 102 from its operative position into its inoperative position and finally the tongue-like mold 94 into its bag-receiving and removing position. Next, the operator removes the bag-like component 22 from the mold surface 96 and formed tongue-like mold 94.

The next step in the process is to invert the thus formed bag-like seat back component 22 so that the exterior surface of the panel 36 is disposed exteriorly thereof. After the bag-like component 22 is inverted, the exterior edge portion 60 of the strip 56 in the seam alone styling character line 42 within the panel 36 is removed from the panel 36 during which the strip 56 is severed along severance line 58.

A final step in forming the seat 10 is to mount the inverted bag-like component 22 with the body of foam material 36 over the frame structure 20 of the seat back assembly. The lower edges of the component are then suitably affixed under the bottom of the frame structure 20 to complete the seat back assembly of the seat 10.

It thus will be seen that the objects of this invention have been fully and effectively accomplished. It will be realized, however, that the foregoing preferred specific embodiment has been shown and described for the purpose of this invention and is subject to change without departure from such principles. Therefore, this invention includes all modifications encompassed within the spirit and scope of the following claims.

What is claimed is:

1. A method of making a seat cover and foam body component including an occupant-engaging panel of cover material having a predetermined exterior surface configuration and an imperforate interior surface with foamable material foamed in place thereon so as to resiliently yieldingly retain the exterior surface in said predetermined configuration, said predetermined configuration being with a periphery of said panel and having at least one elongated sharply concave styling character line therein, said method comprising the steps of utilizing (1) a plastic strip of thin elongated cross-sectional configuration having a central portion of reduced thickness dividing the strip along a severance line into opposite exterior and interior edge portions and (2) a plurality of pieces of cover material of different exterior surface appearance to form said cover material panel, sewing marginal edges of said plurality of cover material pieces with said strip disposed between exterior surfaces of the marginal edges in a configuration coincident with said elongated sharply concave styling character line to form a seam in which a line of stitches extends through the marginal edges of the cover material pieces and the reduced thickness central portion of the strip along the severance line or slightly outwardly thereof.

applying a tape of imperforate material along the seam in sealed relation with the imperforate interior surfaces of the cover material pieces, positioning the sewn and taped panel so that the exterior surface thereof is in facing relation to a mold member having a mold surface formed with a mirror image of said predetermined configuration including an elongated sharply convex ridge corresponding with said sharply concave character line having an elongated slot therein, inserting the exterior edge portion of the strip into said elongated slot so as to accurately locate the seam of the panel along said elongated sharply convex styling character line, creating negative pressure conditions between the mold surface of the molding member and the exterior surface of the panel through openings in the mold surface so as to conform the exterior surface of the panel to the mold surface of the mold member, establishing a confined space on the interior surface of the panel, charging foamable material into the confined space, foaming the foamable material within the confined space so as to adhere a body of foamed material to the interior surface of said panel while the exterior surface is in conformity with the mold surface, removing the panel with the body of foamed material adhered to the interior surface thereof from the mold surface including the exterior edge portion of the strip from the elongated slot, and removing the exterior edge portion of said strip along the severance line thereof from the panel.

2. A method as defined in claim 1 wherein the marginal edges of the two pieces of cover material disposed upwardly of the line of stitches and the interior edge portion of the plastic strip therebetween are sewn together by serging prior to the application of the tape.

3. A method as defined in claim 2 wherein the cover material comprises an exterior surface ply of fabric, an inner ply of foam material and an interior surface of plastic film.

* * * * *